United States Patent [19]

Sekine et al.

[11] 4,382,523
[45] May 10, 1983

[54] TAPE COVER OF MAGNETIC TAPE CASSETTE AND PROCESS FOR PREPARING TAPE COVER

[75] Inventors: Masaoki Sekine; Seiki Shimazu, both of Tokyo, Japan

[73] Assignee: TDK Electronics Co., Ltd., Tokyo, Japan

[21] Appl. No.: 201,912

[22] Filed: Oct. 29, 1980

[30] Foreign Application Priority Data

Nov. 29, 1979 [JP] Japan ................................ 54-153645

[51] Int. Cl.³ .................. B65D 43/16; B29G 2/00; G03B 1/04
[52] U.S. Cl. .................................... 220/337; 206/387; 242/198; 264/328.9
[58] Field of Search ................. 206/387; 242/198; 353/18; 220/337, 342; 264/328.9

[56] References Cited

U.S. PATENT DOCUMENTS

| | | | |
|---|---|---|---|
| 3,650,378 | 3/1972 | Kakiuchi et al. | 206/387 |
| 3,900,172 | 8/1975 | Kamaya | 242/198 |
| 4,004,752 | 1/1977 | Kamaya | 242/198 |

*Primary Examiner*—William T. Dixson, Jr.
*Attorney, Agent, or Firm*—Oblong, Fisher, Spivak, McClelland & Maier

[57] ABSTRACT

A tape cover formed by molding an L-shaped body of an upper plate and a front plate in one piece in which an erroneous insertion detecting notch is formed in the joint portion of both the plates comprises an injecting port as a gate positioned on a side surface of said upper plate in said notch, and the thickness of the wall of said upper plate just below said injecting port is larger than that of the other part of the wall of said upper plate near said injecting port wall.

2 Claims, 8 Drawing Figures

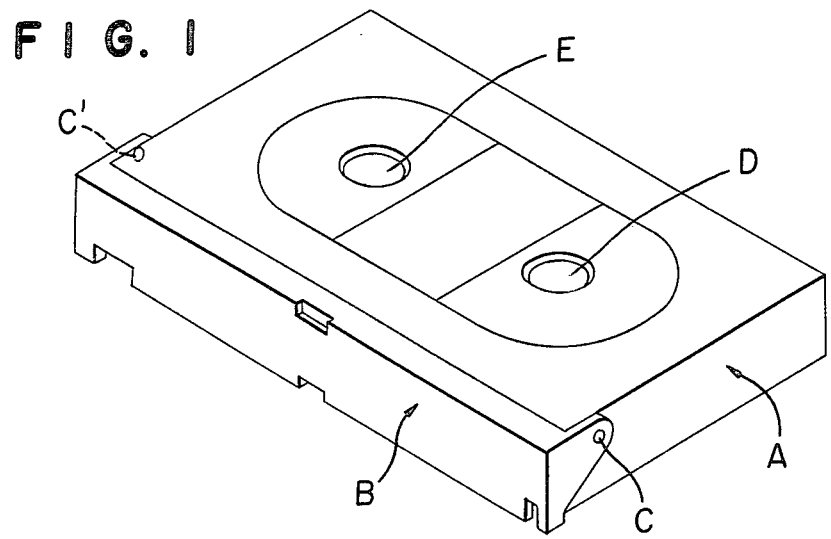
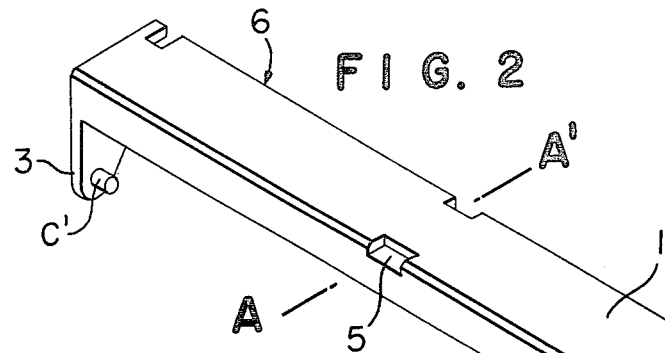
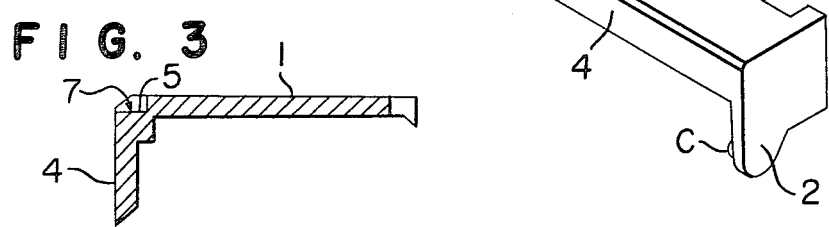
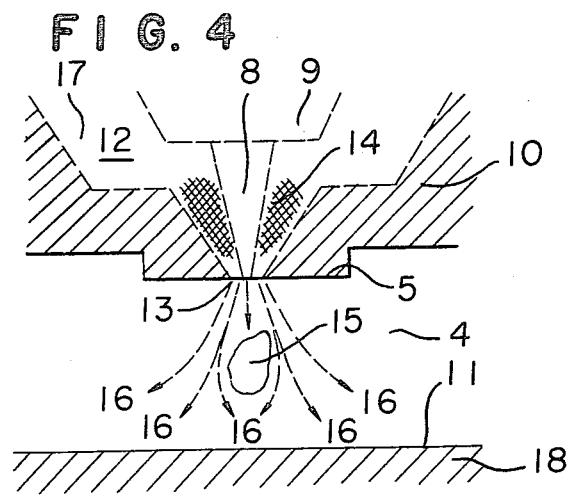

TAPE COVER OF MAGNETIC TAPE CASSETTE AND PROCESS FOR PREPARING TAPE COVER

BACKGROUND OF THE INVENTION

1. Field of the Invention

The present invention relates to a tape cover of a magnetic tape cassette and a preparation thereof.

2. Description of the Prior Art

The conventional tape cassette or cartridge for a video tape cassette comprises a casing (A) holding a magnetic tape and a tape cover (B), provided in front of the casing, for protecting the magnetic tape-running area from dust or mechanical damage as shown in FIG. 1 and the tape cover (B) is hinged to the casing (A) at hinged parts (C),(C') of both ends. Symbols D, E designate the central holes of hubs for winding the magnetic tape.

FIG. 2 is a partially enlarged schematic view of the tape cover (B) and FIG. 3 is a sectional view taken along line A—A'. The tape cover comprises a front plate (1), side plates (2),(3) and an upper plate (4). A reverse insertion detecting notch (5) for preventing the insertion of the cassette or cartridge into a cassette set of the video recorder in the erroneous direction, is formed in the boundary of the front plate (1) and the upper plate (4). When the tape cover (B) is formed, the resin-injection port of a mold is provided at a position on the lower edge (6) of the front plate (1); a resin is injected from the port and the gate or sprue formed in the port is cut off after the injected resin is cured. However, such a treatment after the molding requires excessive time for treating the runner in the molding operation; for removing the runner; for grinding and for transportation required for these operations and decreases productivity, thus increasing the total molding and treating time.

The inventors have studied to overcome the disadvantage described above. As a result, they have found that a runner-less product is required to reduce the number of process and the position of the sprue is limited because the entire surface of the molded product must not be treated as it is already a final product.

The inventors have found that the most preferable position is the point designated by the reference numeral (7) in the reverse insertion detecting notch area. However, when the sprue is formed at this point, the following disadvantage causes decrease in the value of the product. The disadvantage will be explained referring to FIG. 4 which is a partially enlarged view of a part of the mold for forming the notch (5) shown in FIGS. 2 and 3 and is a left side view of FIG. 2.

The reference numeral (10) designates a stationary mold and (18) designates a movable mold. When both molds are closed, a cavity (11) for the tape cover is formed. The reference numeral (4) designates the upper plate of the tape cover formed when the resin is injected and (5) designates a portion for forming the reverse insertion detecting notch.

A passage (17) for injecting molten resin is provided in the stationary mold (10) and a heating element (8) extending to a gate portion (13) at the lower end of a body (9) for melting the resin is positioned in the passage (17). Heat energy is given to the heating element (8) so as to heat the resin (12) remaining near the gate portion (13) at the same time as resin is injected by the molding machine.

In the operation, the molten resin (12) remains in the gate portion (13) in a semi-molten state in the non-operation time between the injecting times. When the resin is injected, it is melted by heat from the heating element (8) and is injected through the outlet of the gate portion (13) into the cavity (11) of the mold. However, a portion of resin (14) remaining in the gate portion (13) flows into the cavity (11) in a highly viscous state whereby it gathers in a position (15). The continuously injected resin follows to paths shown by arrow lines (16) to flow into each part of the cavity (11). A flow mark is caused in the molded product by the viscous mass at the position (15) so that the appearance of the surface of the upper plate (4) is poor.

SUMMARY OF THE INVENTION

It is an object of the present invention to overcome the disadvantage of the conventional tape cover and to provide an improved tape cover and a preparation thereof which reduces the number of processing steps and improves productivity, and, more particularly, prevents the occurrence of a runner or sprue of the molded product which must be removed and prevents the flow mark.

The foregoing and other objects of the present invention have been attained by providing a tape cover formed by molding an L-shaped body of an upper plate and a front plate in one piece in which an erroneous insertion detecting notch is formed in the joint portion of both the plates, wherein a sprue formed from an injecting port is positioned on a side surface of said upper plate in said notch and the thickness of the wall of said injecting port is larger than that of the other part of the wall of said upper plate near said injecting port wall, and by a method of preparation of the tape cover.

BRIEF DESCRIPTION OF THE DRAWINGS

FIG. 1 is a schematic view of a video tape cassette;

FIG. 2 is a schematic view of the conventional tape cover;

FIG. 3 is a cross sectional view taken along the line A—A' of FIG. 2;

FIG. 4 is a partially enlarged cross sectional view of molds illustrating an injection step for preparing the tape cover as shown in FIGS. 2 and 3;

The same reference numerals designate the same or corresponding parts throughout several figures.

DETAILED DESCRIPTION OF THE PREFERRED EMBODIMENT

An embodiment of the present invention will be described.

Figure 5:
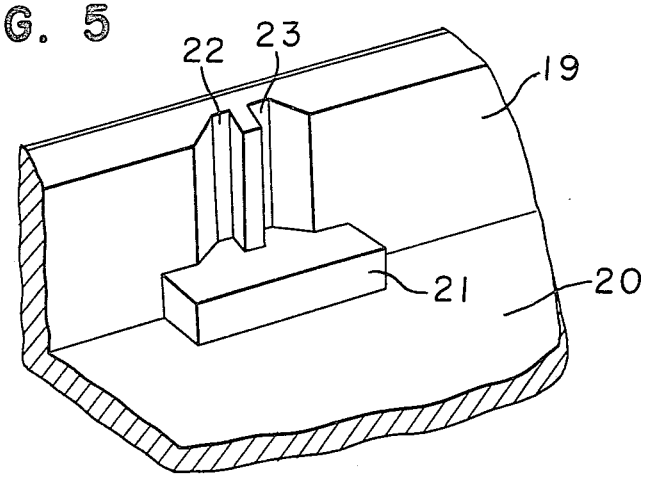
FIG. 5 is a schematic view of the important part of a tape cover of the present invention.
Figure 6:
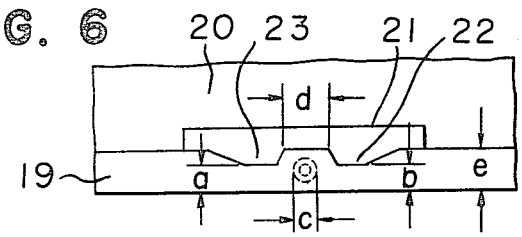
FIG. 6 is a cross sectional view of FIG. 5.
Figure 7:
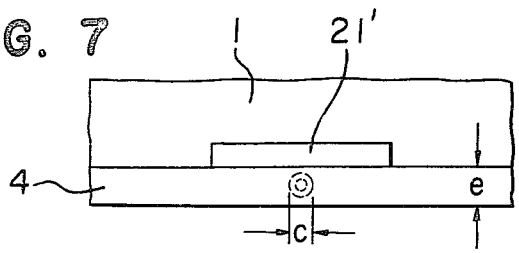
FIG. 7 is a cross sectional view of the conventional tape cover similar to FIG. 6.

FIG. 5 shows a part of the reverse surface of a tape cover as a molded product of the present invention; FIG. 6 is a plan view of the tape cover of FIG. 5 and FIG. 7 is a plan view of the conventional tape cover for the purpose of comparison. In FIGS. 5 and 6, the reference numeral (19) designates an upper plate; (20) designates a front plate; (21) designates a wall formed in the reverse side of a reverse insertion detecting notch (35) (FIG. 8) and (22), (23) designate reduced wall portions formed in the reverse surface of the upper plate (19) of the tape cover corresponding to the position of the notch (35). The injecting port of an injection machine is circularly shaped having a diameter c as shown by a broken line. The resin is injected into a space for forming the upper plate (19) by positioning the injecting port in a portion for forming the notch (35). The molded product is formed by injecting resin from the injecting port positioned in the center of the portion defined by the thickness e and the width d between the reduced wall portions (22),(23). In the FIG. 6, the symbols (a) and (b) designate respectively the thicknesses of the reduced wall portions (22) and (23). The width of the reduced wall portion (the horizontal direction in the FIG. 6) can be determined as required. The structure of the tape cover of the present invention is clearly different from that of the conventional tape cover shown in FIG. 7 wherein the upper plate (4) has a constant thickness (e) and the sprue resulting from the injecting port having a diameter of (c) is positioned at the center of the notch (5) of the upper plate, said upper plate having a raised portion (21') in the reverse side of the notch (5).

Referring to FIG. 6, many experiments have been conducted and it is found that a satisfactory result can be attained when $d=2c$, $a=\frac{1}{2}$ and $b=\frac{1}{2}$ e are given. However, it should be understood that these values are only for an example and various values having a dimensional relationship are applicable.

Figure 8:
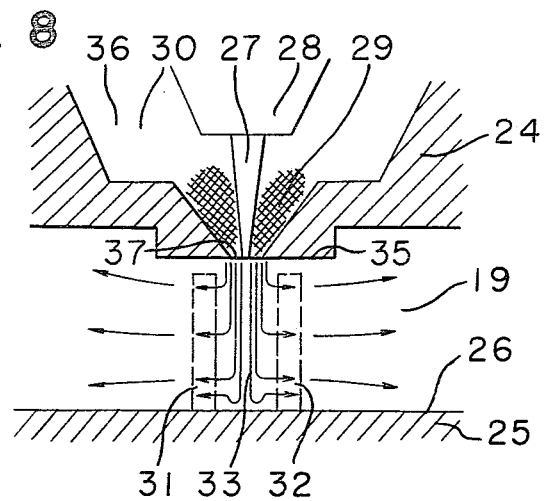
FIG. 8 is a cross sectional view of molds illustrating a method of the present invention.

A mold of the present invention can be prepared to form a cavity for molding which corresponds to the shape of the molded product shown in FIGS. 5 and 6, by modifying the conventional mold. In FIG. 8, the mold comprises a stationary mold (24) and a movable mold (25) which forms the cavity for molding (26) having the feature mentioned above when the stationary mold and the movable mold are closed. The reference numerals (31) and (32) designate projections in the cavity for molding which form the reduced wall portions (22),(23) in the upper plate (19) of the tape cover, (35) designates a reverse insertion detecting notch surface and (19) designates an upper plate after the completion of molding respectively. A passage (30) for molten resin is provided in the stationary mold (24) and a heating body (28) and a heating element (27) are positioned in the passage as with the conventional mold.

In the non-operation time between the injection times, the passage (30) is full of a molten resin (36) and a semi-molten resin (29) remains near the injecting port as a sprue. When the injection operation is initiated, the heating element (27) is actuated and the molten resin is forcibly fed into the cavity (26) of the mold. At first, molten resin (29) having a high viscosity is injected from the injected port (37) and the resin (29) flows into an area near the wide cavity (33) between the projections (31) and (32) together with a continuously supplied resin. However, the flow of resin is substantially blocked because of the projections (31),(32). The high viscous resin in the area (33) is compressed to be of a sufficiently molten state so that the resulting low viscous resin flows into the reduced wall portion formed between the projections (32),(32) and the opposite wall of the cavity in the arrow direction to fill the cavity of the mold. No flow mark is produced on the upper plate just below the sprue.

As described above, in accordance with the present invention, a reduced wall portion surrounds a space just below a gate to increase the resin pressure in the space where resin having a high viscosity remains. When a very high pressure is applied to the resin having high viscosity, the fluidity increases so that an excellent tape cover without flow mark can be obtained.

What is claimed as new and desired to be secured by Letters Patent of the United States is:

1. A cover for a magnetic tape cassette comprising:
   an L-shaped molded body formed of a resinous material, said body including a front plate and an upper plate having a joint therebetween;
   an erroneous insertion detection notch formed in said body at a first front plate surface and a second upper plate surface of said joint; and
   a sprue formed on a third surface of said body in said notch, said sprue comprising resinous material from an outlet of a mold, wherein the upper plate has a first thickness at said sprue and a second thickness at either side of said sprue, said second thickness being less than said first thickness.

2. The cover of claim 1 wherein said second thicknesses on either side of said sprue are provided by a pair of grooves molded into said upper plate.

* * * * *